(12) United States Patent
Khademhosseini et al.

(10) Patent No.: US 12,551,602 B1
(45) Date of Patent: Feb. 17, 2026

(54) NANOENGINEERING OF SHEAR-THINNING BIOMATERIALS

(71) Applicants: The Regents of the University of California, Oakland, CA (US); Mayo Foundation for Medical Education and Research, Rochester, MN (US); Boston Scientific Scimed, Inc., Maple Grove, MN (US)

(72) Inventors: Alireza Khademhosseini, Los Angeles, CA (US); Chun Xu, Los Angeles, CA (US); Hanjun Kim, Los Angeles, CA (US); Ehsan Jabbarzadeh, Columbia, SC (US); Rahmi Oklu, Chandler, AZ (US)

(73) Assignees: MAYO FOUNDATION FOR MEDICAL EDUCATION AND RESEARCH, Rochester, MN (US); The Regents of the University of California, Oakland, CA (US); Boston Scientific Scimed, Inc., Maple Grove, MN (US)

( * ) Notice: Subject to any disclaimer, the term of this patent is extended or adjusted under 35 U.S.C. 154(b) by 953 days.

(21) Appl. No.: 17/099,307

(22) Filed: Nov. 16, 2020

Related U.S. Application Data (60) Provisional application No. 62/935,498, filed on Nov. 14, 2019.

(51) Int. Cl.
| | |
|---|---|
| *A61L 29/16* | (2006.01) |
| *A61K 9/06* | (2006.01) |
| *A61K 9/51* | (2006.01) |
| *A61K 33/00* | (2006.01) |
| *A61K 45/06* | (2006.01) |
| *A61L 29/02* | (2006.01) |
| *A61L 29/04* | (2006.01) |

(52) U.S. Cl.
CPC ............. *A61L 29/16* (2013.01); *A61K 9/06* (2013.01); *A61K 9/5115* (2013.01); *A61K 9/5192* (2013.01); *A61K 33/00* (2013.01); *A61K 45/06* (2013.01); *A61L 29/02* (2013.01); *A61L 29/046* (2013.01); *A61L 2300/41* (2013.01); *A61L 2300/418* (2013.01); *A61L 2400/12* (2013.01)

(58) Field of Classification Search
None
See application file for complete search history.

(56) References Cited

U.S. PATENT DOCUMENTS

| | | | |
|---|---|---|---|
| 10,034,958 | B2 | 7/2018 | Gaharwar et al. |
| 2016/0331738 | A1* | 11/2016 | Jarrett ............ A61K 31/517 |
| 2018/0360920 | A1 | 12/2018 | Khademossein et al. |

OTHER PUBLICATIONS

Algarin et al. (NTSTI-Nanotech 2009 vol. 1, 2009 (198-200)).*

* cited by examiner

*Primary Examiner* — Bennett M Celsa
*Assistant Examiner* — Garen Gotfredson
(74) *Attorney, Agent, or Firm* — Seager, Tufte & Wickhem, LLP (57) ABSTRACT

Shear-thinning biomaterial technology offers enables polymers and drugs loaded inside such polymers to be easily delivered directly through catheters into target area for use, for example, in cancer therapy and immunotherapy. When a force above a certain threshold is applied to inject such materials, they "thin" and behaves as a semi-solid, allowing the material to readily flow through a catheter. When the force is removed, the material instantly becomes a soft solid with significant cohesive properties that prevent it from dislodging or breaking up. We have developed novel shear-thinning biomaterials using spherical silica nanoparticles and gelatin-based polymers. Rheological tests confirm that these materials have excellent shear-thinning properties and further have improved material properties (e.g. improved stability profiles) as compared conventional materials available to medical professionals.

20 Claims, 7 Drawing Sheets

NANOENGINEERING OF SHEAR-THINNING BIOMATERIALS

CROSS REFERENCE TO RELATED APPLICATIONS

This application claims the benefit under 35 U.S.C. Section 119(e) of commonly-assigned U.S. Provisional Patent Application Ser. No. 62/935,498 filed on Nov. 14, 2019 and entitled "NANOENGINEERING OF SHEAR-THINNING BIOMATERIALS" which application is incorporated by reference herein.

STATEMENT OF GOVERNMENT INTEREST

This invention was made with government support under HL137193 and HL140951 awarded by the National Institutes of Health. The government has certain rights in the invention.

TECHNICAL FIELD

The present invention relates to shear thinning biomaterials and methods for making and using them.

BACKGROUND OF THE INVENTION

Shear-thinning hydrogels are non-Newtonian materials that behave as viscous fluids under shear stress and then recover solid-like properties upon elimination of the stress (1). Due to these properties, injectable shear-thinning biomaterials (STB) are attracting attention as a group of self-healing materials that allow for fluent infusion and local equilibrium after approaching the final application site. In clinical applications, STBs can be delivered into the body using a needle or a general/microcatheters by manual pressure (2-4). To optimize the clinical application, it is necessary to adjust the physical properties of STB according to the specific clinical situations. By changing the physical properties, one can synthesize tailored hydrogels for specific clinical applications, such as embolizing a certain size of blood vessel, controlled drug release, and modulation of the stiffness of tissue engineering scaffolds.

The physical properties of conventional STBs can be modulated by a combination of several carbon-based, polymeric, and inorganic nanomaterials (5-8). Several biomaterials, such as gelatin, hyaluronic acid, chitosan, collagen, and alginate have been previously used along with inorganic constituents to form STBs (14-17). In particular, gelatin limits the adsorption of nonspecific proteins, enhanced hemolysis, and ultimately prolongs clotting time, demonstrating substantially improved hemocompatibility of STB in vitro (18). Furthermore, the application of gelatin in tissue engineering and regenerative medicine has been approved by the Food and Drug Administration (FDA) (19-21). Conventional STBs are prepared by mixing gelatin with synthetic clay nanoparticles, Laponite®, for hemostasis and endovascular embolization (18, 22). These STBs exhibit strong shear-thinning behavior as well as biocompatible properties ranging from blood coagulation to minimized inflammatory response. Others have extended this work to implement STBs as embolic agents (23), functionalized scaffolds (24, 25), 3D-bioinks (26) and drug delivery systems (27). Unfortunately, however, synthetic clay nanoparticles such as Laponite are crystallized nanoparticles and the size, surface chemistry are not easily tuned. In addition, the biocompatibility of Laponite in various in vivo uses needs to be further investigated, a fact which complicates its use in clinical applications.

For the reasons noted above, there is a need in the art for new shear-thinning materials and methods for making and using them.

SUMMARY OF THE INVENTION

Figure 1:
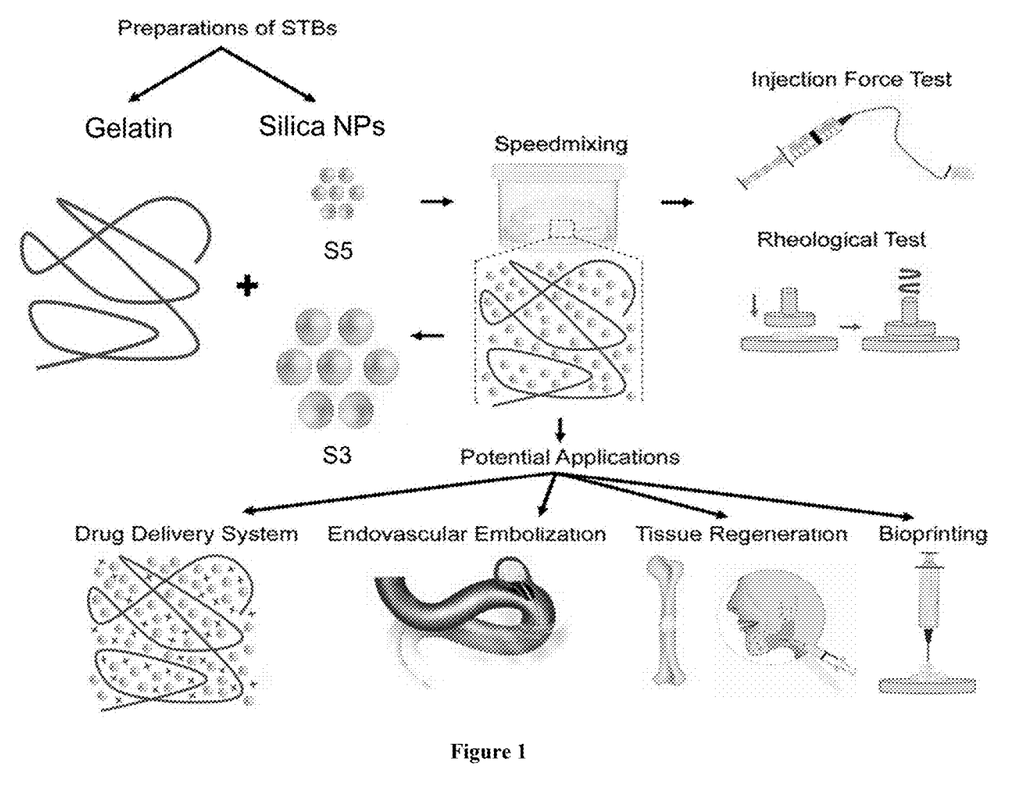
FIG. 1 provides a schematic illustration showing the process of preparation, characterization and potential applications of novel STBs comprising silica nanoparticles.

As discussed below, we have developed novel shear-thinning biomaterials using spherical silica nanoparticles and gelatin-based polymers. The silica nanoparticles are composite of pure $SiO_2$ and have spherical morphology. As illustrative working embodiments of the invention, two silica nanoparticles with the size of 10 and 30 nm were used to fabricate STBs. The degradation, mechanical and rheological properties of various compositions of silica nanoparticle-based STBs were then evaluated (see, e.g. FIG. 1). Rheological tests showed that the materials disclosed herein have excellent shear-thinning properties, and that the injection force used with these materials can be easily tuned for a variety of different biomedical applications. In addition, the biomaterials disclosed herein show improved stability profiles (e.g. longer shelf life) as compared to similar materials known in the art.

The invention disclosed herein has a number of embodiments. Embodiments of the invention include, for example, a shear-thinning biocompatible composition of matter comprising spherical silica nanoparticles and gelatin. In typical embodiments of the invention, the spherical silica nanoparticles have a median diameter of from 5 nm to 150 nm and/or comprise a negative charge at physiological pH (e.g. have a zeta potential of at least −10 mV at physiological pH). Optionally the spherical silica nanoparticles comprise from 5% to 45% (w/v) of the composition; and/or the gelatin comprises from 1% to 30% of the composition. In certain embodiments of the invention, the constituents or relative amounts the constituents are selected to tune or modulate one or more rheological properties of the composition. For example, in certain embodiments of the invention, the spherical silica nanoparticles comprise not more than 9% (w/v) of the composition. In some embodiments of the invention, the composition is disposed within a vessel (e.g. a catheter) selected for its ability to facilitate a user modulating one or more rheological properties of the composition.

Certain embodiments of the compositions of the invention include additional agents such as a pharmaceutical excipient selected from the group consisting of a preservative, a tonicity adjusting agent, a detergent, a viscosity adjusting agent, a sugar and a pH adjusting agent. Optionally, the compositions of the invention include one or more therapeutic agents such as an anti-inflammatory agent, an agent that modulates coagulation, an antibiotic agent, a chemotherapeutic agent or the like.

Another embodiment of the invention is a method of delivering a shear-thinning biocompatible composition disclosed herein to a preselected site (e.g. an in vivo location where an individual has experienced trauma or injury). Typically, such methods comprise disposing the composition in a vessel having a first end comprising an opening and a second end (e.g. a catheter); applying a force to the second end of the vessel, wherein the force is sufficient to liquify the composition; and then delivering the composition out of the vessel through the opening and to the preselected site.

Yet another embodiment of the invention is a method of making a shear-thinning biocompatible composition disclosed herein comprising combining together spherical silica nanoparticles and gelatin, and optionally a pharmaceutical excipient and/or a therapeutic agent so as to form a shear-thinning biocompatible composition. In certain embodiments of these methods, a surface property of the spherical silica nanoparticles, a median diameter of the spherical silica nanoparticles, a relative amount of spherical silica nanoparticles; and/or a relative amount of gelatin or the like is selected to tune or modulate one or more rheological properties of the shear-thinning biocompatible composition. By modulating the mechanical properties of the compositions of the invention in this manner, embodiments of the invention can be tailored for use in a variety of different clinical applications.

Other objects, features and advantages of the present invention will become apparent to those skilled in the art from the following detailed description. It is to be understood, however, that the detailed description and specific examples, while indicating some embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

FIGS. 2A-2E provide photographs showing the characterizations of silica nanoparticle-based STB. Images showing the injectability of silica nanoparticles-based STB through a catheter and needle (22 gauge) and forming a solid freestanding structure in air as shown in FIG. 2A and water as shown in in FIG. 2B.

FIGS. 4A-4D provide data from the from studies of the injection force and stability of silica nanoparticle-based STB with various composition.

FIG. 5 provides photographs showing the in vitro cytocompatibility assessment of 10 nm or 30 nm SNP-STBs at days 1, 3 and 7. In these studies, NIH/3T3 fibroblasts were seeded on hydrogels-coated slides followed by culturing for 7 days and intermittent staining with Live/Dead cell imaging assay.

FIG. 7 provide photographs and data on an In vitro STB evaluation platform. The upper left panel shows a system comprising (A) Peristaltic pump. (B) Pressure monitoring and transmitting system. (C) STB-filled syringe. (D) Solution input to the platform. (E) Solution output from the platform. (F) SLA-3D printed aneurysm model. (G) Pressure sensor. (H) Catheter applicator. As shown in the upper right panel, under this system, conventional STB and SNP-STBs were tested using PBS and human blood. Graphed data from these studies is shown in the left and right lower panels where the bar graphs represents the mean pressure required to displace STBs.

DETAILED DESCRIPTION OF THE INVENTION

In the description of embodiments, reference may be made to the accompanying figures which form a part hereof, and in which is shown by way of illustration a specific embodiment in which the invention may be practiced. It is to be understood that other embodiments may be utilized, and structural changes may be made without departing from the scope of the present invention. Unless otherwise defined, all terms of art, notations and other scientific terms or terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art. Many of the aspects of the techniques and procedures described or referenced herein are well understood and commonly employed by those skilled in the art. The following text discusses various embodiments of the invention.

Shear-thinning biomaterial (STB) technology offers unique properties enabling a solid polymer and drugs loaded inside to be easily delivered directly through means such as catheters into target area. In view of this, we have developed a class of novel shear-thinning biomaterials using spherical silica nanoparticles and gelatin-based polymers. Among inorganic composite compositions, silica is classified as "Generally Recognized As Safe (GRAS)" FDA, and is considered one of the most biocompatible materials. In view of this, silicate nanoparticles have been employed in pharmaceutical, cosmetic and food industries as active ingredients or rheological modifiers due to their uniform particle size with electrical surface charges and bioactive properties (9, 10). In addition, the size, structure, surface properties of silica nanoparticles can be easily tuned, properties which allow silica nanoparticles to provide a class of materials that are useful in a wide variety of biomedical applications.

Embodiments of the invention include, for example, a shear-thinning biocompatible composition of matter comprising spherical silica nanoparticles and gelatin. In some embodiments, the spherical silica nanoparticles are mesoporous. In some embodiments, the compositions comprise spherical silicon dioxide nanopowder. In some embodiments, the surface of the spherical silica nanoparticles is functionalized, for example, with carboxyl or amine groups. In some embodiments, the gelatin is methacrylated gelatin (GelMA), acrylated gelatin, thiolated gelatin, aminated gelatin or combinations thereof. The compositions of the invention can include further constituents such as additional polymers, excipients, therapeutic agents and the like. For example, compositions of the invention can include one or more Food and Drug Administration (FDA) approved or cytocompatible polymers. Such polymers include alginate, chitosan, collagen, hyaluronic acid (HA), chondroitin sulfate (ChS), dextrin, gelatin, fibrin, peptide, and silk. Synthetic polymers such as poly(ethylene glycol) (PEG), poly(ethylene oxide) (PEO), poloxamer (Pluronic®) (PEO-PPO- PEO), polyoxamine (Tetronic®) (PEO-PPO), poly(vinyl alcohol) (PVA), poly(lactic-co-glycolic acid) (PLGA), poly (glycolic acid) (PGA), poly(lactic acid) (PLA), polycaprolactone (PCL), poly(L-glutamic acid) (PLga), polyanhydrides, poly(N-isopropylacrylamide) (PNIPAAm), polyaniline and the like can also be included in compositions of the invention. As is known in the art, preparations of hydrogels can be made to include either chemically or physically crosslinked materials.

Certain embodiments of the compositions of the invention include, for example a pharmaceutical excipient such as one selected from the group consisting of a preservative, a tonicity adjusting agent, a detergent, a viscosity adjusting agent, a sugar and a pH adjusting agent. For compositions suitable for administration to humans, the term "excipient" is meant to include, but is not limited to, those ingredients described in Remington: The Science and Practice of Pharmacy, Lippincott Williams & Wilkins, 21st ed. (2006) the contents of which are incorporated by reference herein.

Optionally, the compositions of the invention include one or more therapeutic agents such as an embolic agent, an anti-inflammatory agent, an agent that modulates coagulation, an antibiotic agent, a chemotherapeutic agent or the like. Compositions of the invention can be formulated for use as carriers or scaffolds of therapeutic agents such as drugs, cells, proteins, and bioactive molecules (e.g., enzyme). As carriers, such compositions can incorporate the agents and deliver them to a desired site in the body for the treatments of a variety of pathological conditions. These include, for example, infectious and inflammatory diseases (e.g. Parkinson's disease, bacterial and antimicrobial infection, diabetes and the like) as well as cancers (e.g. colon, lung, breast, ovarian, lymphoma cancers and the like). Moreover, embodiments of the invention can include immunomodulatory agents useful for immunotherapy in order to, for example, enhance components of the immune system. In certain embodiments of the invention, the composition includes a therapeutic agent selected from an anti-inflammatory agent, an embolic agent, and a chemotherapeutic agent. Illustrative embolic agents include, for example, stainless steel coils, absorbable gelatin pledgets and powders, polyvinyl alcohol foams, ethanol, glues and the like. Illustrative hemostatic agents include, for example, Celox, QuikClot and Hemcon. Certain illustrative materials and methods that can be adapted for use in such embodiments of the invention are found, for example in Hydrogels: Design, Synthesis and Application in Drug Delivery and Regenerative Medicine 1st Edition, Singh, Laverty and Donnelly Eds; and Hydrogels in Biology and Medicine (Polymer Science and Technology) UK ed. Edition by J. Michalek et al. In addition, as scaffolds, compositions of the invention can provide a flexible dwelling space for cells and other agents for use in tissue repair and the regeneration of desired tissues (e.g. for cartilage, bone, retina, brain, and, neural tissue repair, vascular regeneration, wound healing and the like).

In some embodiments, the spherical silica nanoparticles have a particle size from about 5 nm to about 500 nm, including about 5 nm, about 10 nm, about 20 nm, about 30 nm, about 40 nm, about 50 nm, about 60 nm, about 70 nm, about 80 nm, about 90 nm, about 100 nm, about 110 nm, about 120 nm, about 130 nm, about 140 nm, about 150 nm, about 160 nm, about 170 nm, about 180 nm, about 200 nm, about 210 nm, about 220 nm, about 230 nm, about 240 nm, about 250 nm, about 260 nm, about 270 nm, about 280 nm, about 290 nm, about 300 nm, about 310 nm, about 320 nm, about 340 nm, about 350 nm, about 360 nm, about 370 nm, about 380 nm, about 390 nm, about 400 nm, about 410 nm, about 420 nm, about 430 nm, about 440 nm, about 450 nm, about 460 nm, about 470 nm, about 480 nm, about 490 nm, to about 500 nm including all subranges and values and ranges therebetween. In some embodiments, particle size is measured by TEM.

In some embodiments, the spherical silica nanoparticles have a median diameter of from about 5 nm to about 250 nm, including from about 5 nm, about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, about 100 nm, about 105 nm, about 110 nm, about 115 nm, about 120 nm, about 125 nm, about 130 nm, about 135 nm, about 140 nm, about 145 nm, about 150 nm, about 160 nm, about 170 nm, about 180 nm, about 190 nm, about 200 nm, about 210 nm, about 220 nm, about 240 nm, to about 250 nm, including all ranges and values therebetween.

In typical biocompatible shear thinning compositions of the invention, the spherical silica nanoparticles have a median diameter of from 5 nm to 150 nm and/or comprise a negative charge at physiological pH (e.g. have a zeta potential of at least −10 mV at physiological pH). Optionally the spherical silica nanoparticles comprise from 5% to 45% (w/v) of the composition; and/or the gelatin comprises from 1% (w/v) to 30% (w/v) of the composition. In certain embodiments of the invention, the constituents or relative amounts the constituents are selected to tune or modulate one or more rheological properties of the composition. For example, in certain embodiments of the invention, the spherical silica nanoparticles comprise not more than from 5% to 15% (w/v) of the composition (e.g. not more than 9% (w/v) of the composition).

In some embodiments, the spherical silica nanoparticles comprise from 1% to 45% (w/v) of the composition; including from about 1% (w/v), about 1.5% (w/v), about about 2% (w/v), about 2.5% (w/v), about 3% (w/v), about 3.5% (w/v), about 4% (w/v), about 4.25% (w/v), about 4.5% (w/v), about 5% (w/v), about 6% (w/v), about 7% (w/v), about 8% (w/v), about 9% (w/v), about 10% (w/v), about 11% (w/v), about 12% (w/v), about 13% (w/v), about 14% (w/v), about 15% (w/v), about 16% (w/v), about 17% (w/v), about 18% (w/v), about 19% (w/v), about 20% (w/v), about 21% w/v), about 22% (w/v), about 23% (w/v), about 24% (w/v), about 25% (w/v), about 26% (w/v), about 27% (w/v), about 28% (w/v), about 29% (w/v), about 30% (w/v), about 31% (w/v), about 32% (w/v), about 33% (w/v), about 34% (w/v), about 35% (w/v), about 36% (w/v), about 37% (w/v), about 38% (w/v), about 39% (w/v), about 40% (w/v), about 41% (w/v), about 42% (w/v), about 43% (w/v), about 44% (w/v), to about 45% (w/v) of the composition, including all ranges and values therebetween. In some embodiments, the spherical nanoparticles comprise from about 15 (w/v), to about 40% (w/v). In some embodiments, the spherical nanoparticles comprise from about 20 (w/v), to about 30% (w/v). In some embodiments, the spherical silica nanoparticles comprise 5% to about 45% of Silica.

In some embodiments, the gelatin comprises from about 1% (w/v) to about 30% (w/v) of the composition; including from about 1% (w/v), about 1.5% (w/v), about 2% (w/v), about 2.5% (w/v), about 3% (w/v), about 3.5% (w/v), about 4% (w/v), about 4.5% (w/v), about 5% (w/v), about 6% (w/v), about 7% (w/v), about 8% (w/v), about 9% (w/v), about 10% (w/v), about 11% (w/v), about 12% (w/v), about 13% (w/v), about 14% (w/v), about 15% (w/v), about 16% (w/v), about 17% (w/v), about 18% (w/v), about 19% (w/v), about 20% (w/v), about 21% (w/v), about 22% (w/v), about 23% (w/v), about 24% (w/v), about 25% (w/v), about 26% (w/v), about 27% (w/v), about 28% (w/v), about 29% (w/v), to about 30% (w/v) of the composition, including all ranges and values therebetween. In some embodiments, the spherical nanoparticles comprise from about 1% (w/v) to about 5% (w/v).

In some embodiments, water comprises from about 0.5% (w/v) to about 99% (w/v) of the composition, including from about 0.5% (w/v), about 1% (w/v), about 5% (w/v), about 10% (w/v), about 15% (w/v), about 20% (w/v), about 25% (w/v), about 30% (w/v), about 35% (w/v), about 40% (w/v), about 45% (w/v), about 50% (w/v), about 55% (w/v), about 60% (w/v), about 65% (w/v), about 70% (w/v), about 75% (w/v), about 80% (w/v), about 85% (w/v), about 90% (w/v), about 95% (w/v), to about 99% (w/v), including all subranges and values therebetween.

In some embodiments, the ratio of the spherical silica nanoparticles to the gelatin in the composition is from about 50:1 to about 1:50, including about 50:1, about 45:1, about 40:1, about 35:1, about 30:1, about 25:1, about 20:1, about 15:1, about 10:1 about 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9, about 1:10, about 1:15, about 1:20, about 1:25, about 1:30, about 1:35, about 1:40, about 1:45, to about 1:50 including all ranges and values therebetween. In some embodiments, the ratio of the spherical silica nanoparticles to the gelatin in the composition is from about 30:1 to about 10:1, or from about 25:1 to about 10:1.

In some embodiments the composition comprises from about 20% (w/v) to about 35% (w/v) spherical silica nanoparticles, including all subranges and values therebetween and from about 1% (w/v) to about 4.5% (w/v) gelatin, including all subranges and values therebetween. In some embodiments, the composition comprises about 20% (w/v), or about 22.5% (w/v), or about 25% (w/v), or about 27.5% (w/v), or about 30% (w/v), or about 35% spherical silica nanoparticles; and from about 1% (w/v) to about 4.5% (w/v) gelatin, including all subranges and values therebetween. In some embodiments, the spherical silica nanoparticles have a particle size from about 1 nm to about 50 nm, or from about 5 nm to about 40 nm, or from about 10 nm to about 30 nm. In some embodiments, the spherical silica nanoparticles have a particle size of about 30 nm. In some embodiments, the spherical silica nanoparticles have a particle size of about 10 nm.

In some embodiments of the invention, the composition is disposed within a vessel (e.g. a catheter) selected for its ability to facilitate a user modulating one or more rheological properties of the composition (e.g. by applying manual pressure to a 5-FR general catheter or a 2.4-Fr microcatheter). Certain illustrative materials and methods that can be adapted for use in embodiments of the invention are found, for example in Biomedical Hydrogels: Biochemistry, Manufacture and Medical Applications (Woodhead Publishing Series in Biomaterials) 1st Edition; Steve Rimmer (Editor). As noted above, in certain embodiments of the invention, the constituents or relative amounts the constituents are selected to tune or modulate one or more rheological properties of the composition. For example, in certain embodiments of the invention, the constituents or relative amounts of the constituents are selected so that the composition: exhibits a shear stress of at least 50 (or 100) Pa at a shear rate of 0.1 (1/s); and/or exhibits a viscosity of at least 1,000 Pa*s at a shear rate of 0.1 (1/s); and/or exhibits a storage modulus of at least 1,000 (or 10,000) Pa (see, e.g. FIG. 3). Yet another embodiment of the invention is a method of making a shear-thinning biocompatible composition disclosed herein comprising combining together spherical silica nanoparticles and gelatin, and optionally a pharmaceutical excipient and/or a therapeutic agent so as to form a shear-thinning biocompatible composition. In certain embodiments of these methods, a surface property of the spherical silica nanoparticles, a median diameter of the spherical silica nanoparticles, a relative amount of spherical silica nanoparticles; and/or a relative amount of gelatin or the like is selected to tune or modulate one or more rheological properties of the shear-thinning biocompatible composition (e.g. so that the composition: exhibits a shear stress of at least 50 (or 100) Pa at a shear rate of 0.1 (1/s); and/or exhibits a viscosity of at least 1,000 Pa*s at a shear rate of 0.1 (1/s); and/or exhibits a storage modulus of at least 1,000 (or 10,000) Pa (see, e.g. FIG. 3)). By modulating the mechanical properties of the compositions of the invention in this manner, embodiments of the invention can be tailored for use in a variety of different clinical applications. In this context, a wide variety of art accepted materials and methods can be adapted for use in embodiments of the invention, for example those disclosed in U.S. Patent Publication Nos.: 20050227910, 20100120149, 20120315265, 20140302051 and 20190290804; and Lee, Biomaterials Research volume 22, Article number: 27 (2018); Thambi et al., J Control Release. 2017 Dec. 10; 267:57-66. doi: 10.1016/j.jconrel.2017.08.006. Epub 2017 Aug. 4; and Gianonni et al., Biomater. Sci., 2016, the contents of which are incorporated by reference.

Another embodiment of the invention is a method of delivering a shear-thinning biocompatible composition disclosed herein to a preselected site (e.g. an in vivo location where an individual has experienced trauma or injury). Typically, such methods comprise disposing the composition in a vessel having a first end comprising an opening and a second end (e.g. a catheter such as a 5-FR general catheter or a 2.4-Fr microcatheter); applying a force to the second end of the vessel, wherein the force is sufficient to liquify the composition; and then delivering the composition out of the vessel through the opening and to the preselected site.

Yet another embodiment of the invention is a method of occluding a conduit (e.g. a blood vessel). Typically the method comprises disposing an silica nanoparticle/gelatin composition disclosed herein in a region of fluid flow within the conduit, wherein amounts of the composition are disposed in an area of fluid flow within the conduit that are sufficient to inhibit fluid flow through the conduit, thereby inhibiting fluid flow, so that the conduit is occluded. Optionally, the composition comprises spherical silica nanoparticles having a median diameter of from 5 nm to 150 nm and a zeta potential of at least −5 mV at physiological pH; the spherical silica nanoparticles comprise not more than 9% (w/v) of the composition; and the gelatin comprises from 1% to 30% of the composition. In certain embodiments of the invention, the composition further includes a therapeutic agent selected from an anti-inflammatory agent, a hemostatic agent an embolic agent, a chemotherapeutic agent or the like. In this context Optionally, the composition is disposed within the conduit using a 5-FR general catheter or a 2.4-Fr microcatheter.

As discussed herein, we have developed a novel shear-thinning biomaterial with the composite of gelatin and biocompatible silica nanoparticles with a variety of desirable properties. By tuning the properties of silica nanoparticles such as particles size and composition of gelation/silica nanoparticles, the mechanical and rheological properties can be carefully adjusted to meet different requirements (e.g. for different clinical applications). We confirmed that embodiments of these STBs are able to be delivered through both 5 Fr general catheter and 2.4 Fr microcatheter by manual pressure. The rheological tests showed rapid recovery and mechanical stability with shear-thinning characteristics which mainly depended on silica nanoparticles. All results demonstrated that the novel STBs disclosed herein can be modulated to exhibit a variety of different specific properties appropriate for a variety of different clinical applications.

Illustrative Materials and Methods of the Invention

Preparation of Silica Nanoparticles-Based STB

Silica nanoparticles with the size of 30 nm (S3) and 10 nm (S5) were obtained from Sigma-Aldrich (St Louis, MO, USA). Stock solution of silica nanoparticles with different concentrations were prepared by adding different amount of silica nanoparticle powder in Milli-Q water and mixed well with a Speedmixer (3000 rpm, 5 min). For the gelatin solution preparation, gelatin (type A, G1890, Sigma, CA, USA) were dissolved in Milli-Q water with heating (up to 60° C.) and a stock concentration of 18% (w/v) was prepared. Silica nanoparticles-based STB with different concentrations of gelatin (1.5 to 4.5%) and Silica NPs (20 to 35%) were synthesized by mixing the desired amount of both stock solutions and mixed with Speedmixer (3000 rpm, 5 mins for three times with 5 mins interval).

Characterization of the Nanocomposite

The TEM images of silica nanoparticles were taken on TF20 (Tecnai G2, Tecnai, USA) with an accelerate voltage of 200 kV. The samples were prepared by dispersing the silica nanoparticles in ethanol, then place a drop on the TEM grid. For the optical images of STB, the silica nanoparticles-based STB were loaded into medallion syringes (1 cc (MSS011), 3 cc (MSS031); Merit Medical Systems, UT, USA) and injected through medical catheters (5-French Beacon, 2.4-French Beacon; Cook Incorporated, IN, USA). The photos were taken by a digital camera.

Degradability of Silica Nanoparticles-Based STB

The degradability test was performed according to previous protocols with minor modification (29, 30). Briefly, silica nanoparticles-based STB (200 mg) were incubated with human plasma (Sigma), in 1.5-ml Eppendorf tubes (VWR, CA, USA) at 37° C. After incubation for 1, 4, 6, 24, 28, and 48 hours, the plasma was replaced with fresh human plasma and then the silica nanoparticles-based STB were weighed. The relative weight of silica nanoparticles-based STB % was defined as $DR=(W_r/W_0) \times 100\%$, where $W_r$ and $W_0$ were the weight of the remaining silica nanoparticles-based STB at various time points and the weight of silica nanoparticles-based STB at the initial state, respectively. The experiments were repeated at least four times, and all data were averaged over all replicates.

Injectability of Silica Nanoparticles-Based STB

To test the injection force, silica nanoparticles-based STB were loaded into medallion syringes (1 cc (MSS011), 3 cc (MSS031); Merit Medical Systems, UT, USA) and injected through medical catheters (5-French Beacon, 2.4-French Beacon; Cook Incorporated, IN, USA). Following the combination of syringe-catheter used in the clinic, each material was tested using a 1 cc syringe with a 2.4-Fr microcatheter and a 3 cc syringe with a 5-Fr catheter. The injection force was monitored by a mechanical tester (Instron 5943, Instron Int. Ltd., MA, USA) with a 100-N load cell and recorded by Bluehill version 3 software, using an extension rate of 1.67 mm/s. The average injection force of the plateau was obtained by quadruple measurements of three identical compositions of silica nanoparticles-based STB.

Rheological Test of Silica Nanoparticles-Based STB

Rheological properties of silica nanoparticles based STB were evaluated by a Rheometer (AR-G2, TA instruments protocol) according to previously described protocols with minor modifications (18, 22). Shear stress, viscosity, and storage moduli were measured with a parallel plate geometry. Before testing, all composite hydrogel samples were equilibrated at room temperature for 2 min. To prevent water evaporation, mineral oil was added around the plate after composite hydrogel samples were loaded on the plate. For all samples, oscillatory stress sweep was completed at 0.1-1000 Pa under a fixed oscillatory frequency 1 Hz, and oscillatory frequency sweep was achieved at 0.1-100 Hz under fixed oscillatory stress 10 Pa at 25° C. The shear stress, viscosity, and storage moduli were recorded by Anton Paar Rheocompass™ software.

Stability Tests

For the stability tests, the injection property the above prepared STB with different compositions were tested at different time point. Briefly, the average injection force of STB was obtained by quadruple measurements of three identical compositions of silica nanoparticles-based STB using above mentioned method. Then the STB was stored at 4° C. for 3 weeks. The injectability was tested again using exactly the same conditions.

Statistical Analysis

Data are displayed as mean±standard deviation (SD). All statistical analyses and graphs were carried out by SPSS Statistics software (IBM, IL, USA) and GraphPad Prism 8.0 (GraphPad Software, CA, USA). Multiple comparisons were analyzed using one-way ANOVA with Tukey post hoc tests for more than triplicate of group data sets. $p<0.05$ was classified as statistically significant for the tests.

Figure 5:
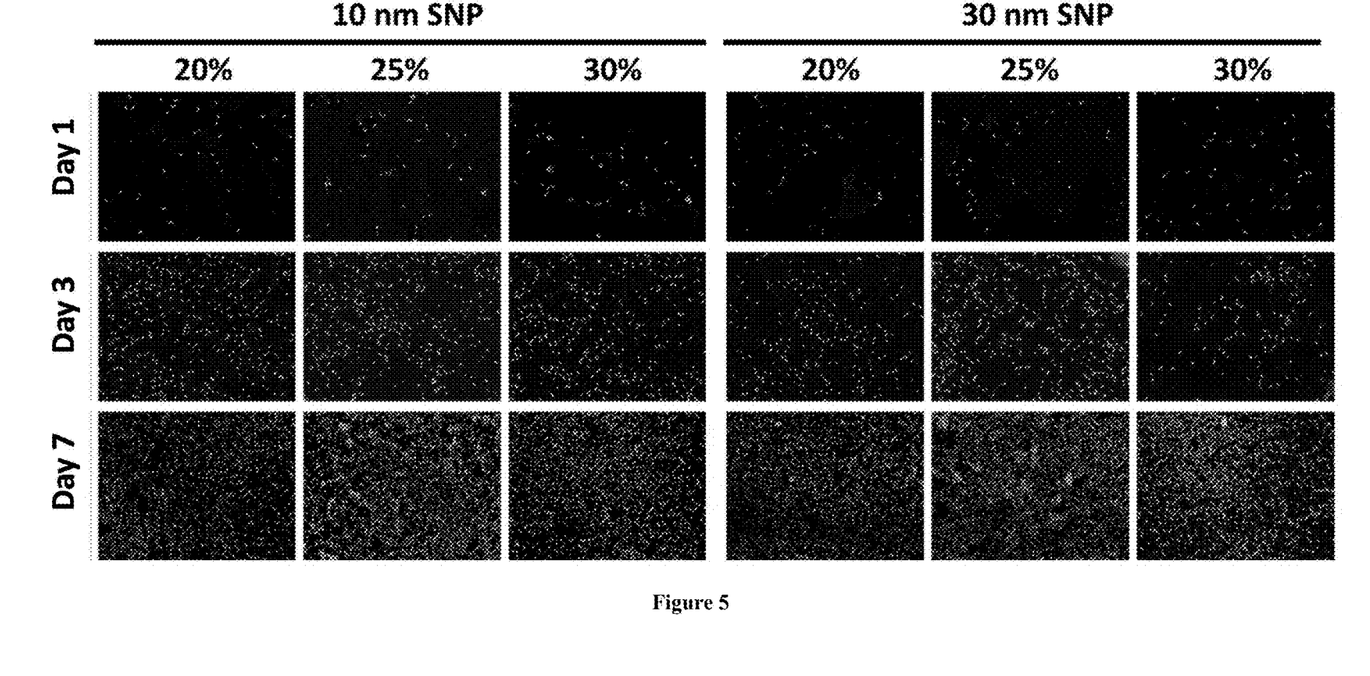

Characterization of Host Immune and Hemostatic Response of SNP-Based STB for Endovascular Delivery To assess the clinical application of SNP-STBs, bioactive effects of both sizes of SNPs were evaluated. First, we analyzed cytotoxicity as a function of SNP size by using mouse fibroblasts (NIH/3T3) (FIG. 5). Cell viability was evaluated using a live/dead viability kit (LIVE/DEAD® Viability/Cytotoxicity Kit, Invitrogen, USA.) Samples were coated on the bottom of the chambers. Cells were then seeded on the coated samples and incubated at 37° C. for 1, 3 or 7 days. The stained cells were imaged by fluorescent microscope (Zeiss Axio Observer; Carl Zeiss, Jena, Germany). For each time point, samples were analyzed in triplicate. Both 10 nm and 30 nm SNPs with three different concentrations of SNP-STBs did not cause cytotoxicity and cells proliferated for up to 7 days (FIG. 5). Interestingly, the stock concentration of 25% SNP-STB fabricated with 10 nm and 30 nm SNPs showed the highest cell proliferation was observed at day 7.

Figure 6:
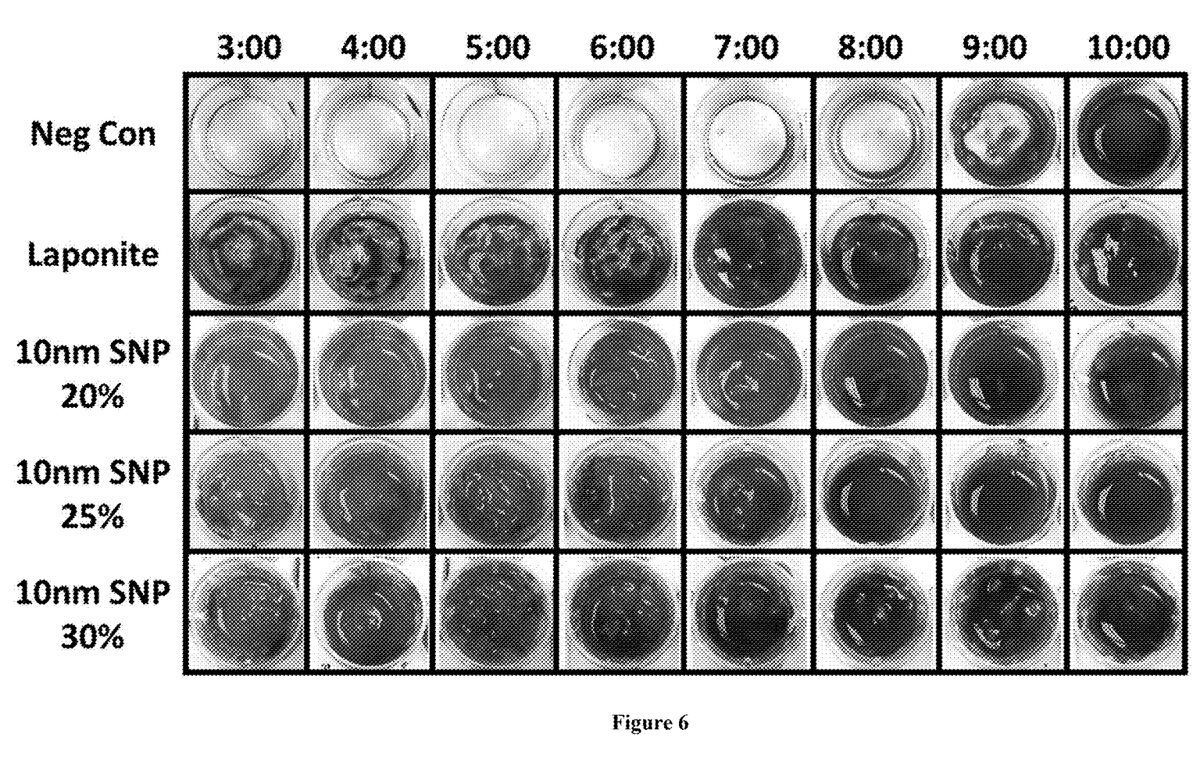
FIG. 6 provide photographs at different times from blood clotting assays in contact with various STB formulations.

To compare the hemostatic activity of SNP-STBs with laponite-based STBs, we performed an in vitro coagulation test. The hemostatic ability of SNP-STBs was evaluated by monitoring the clotting time of whole blood in contact with the nanocomposite surfaces in 24-well plates. Citrated blood was mixed with 10% (w/v) 0.1 M $CaCl_2$ in Milli-Q deionized water and pipetted to mix. At selected time points, each well was washed with 9 g/L saline solution to halt clotting. The liquid was immediately aspirated and washes repeated until the solution was clear, indicating removal of all soluble blood components. The surface of the STB exhibited similar activity as laponite-based STBs that we previously reported for endovascular embolization. Clotting times were accelerated when blood was in contact with either laponite-based STBs or SNP-based STBs, compared to controls (FIG. 6), as assessed by qualitative analysis. In the negative control group, blood clots formed in 9-10 minutes, whereas in Laponite-based STBs and SNP-based STBs, blood clot formation started at 6 minutes. Interestingly, elevated SNP contents lead to faster blood clotting. This trend has been reported by us before when testing laponite based-STBs in a similar experiment. In the previous study, we showed a reduction in clotting time for higher nanoplatelet concentrations (Gaharwar, A. K., et al., Shear-thinning nanocomposite hydrogels for the treatment of hemorrhage. ACS Nano, 2014. 8 (10): p. 9833-42). 9NC25, 9NC50, and 9NC75 reduced the clotting time by 32%, 54%, and 77%, respectively, when compared to the control (blood in uncoated wells). Based on our results, our SNP-based STBs have 1) shear thinning properties, 2) excellent injectability (less than 10N), 3) cytocompatibility, 4) and reduced blood clotting time to meet the requirements of an endovascular embolization agent.

Figure 7:
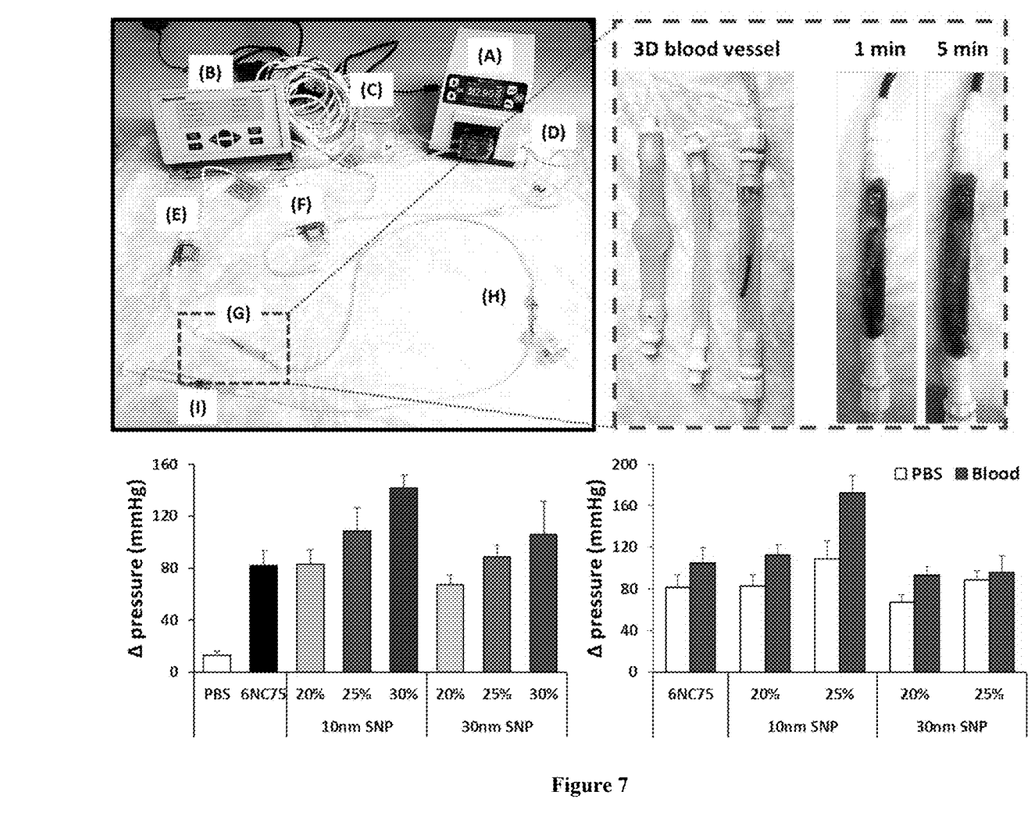

Establishment of STB Evaluation Platform Using SLA-3D Printed Blood Vessel Model The potential of Laponite based-STB and SNP-based STBs for the occlusion of the in vitro blood vessel models was evaluated by filling the SLA-3D printed blood vessel model (straight, diameter; 8 mm). FIG. 7 shows the overall view of our in vitro STB evaluation platform. The in vitro STB evaluation platform contains a 1) peristaltic pump (provide continuous pulsatile flow) (Cole-Parmer, IL, USA), 2) pressure monitoring and transmitting system (PendoTech, NJ, USA), 3) one pair of pressure sensors (proximal/distal to 3D blood vessel model, PendoTech), 4) STB-filled 3 cc syringe & 5Fr catheter, 5) input and output port, and 6) SLA-3D printed straight blood vessel model. The system can monitor changes in vascular pressure due to STB application, maintain continuous pulsating flow circulation, and analyze the remaining STB in the blood vessel models. In particular, the pressure sensors were placed before and after the 3D blood vessel to check the pressure change of the entire system during injection as well as the pressure due to occlusion of the blood vessel. STBs were applied to the aneurysm site through a 5Fr catheter (Cook Medical, IN, USA). In the meantime, the in vitro system was filled with PBS or blood in a 2.79 mm tube and maintained at a flow rate of 20 ml/min. As shown in the FIG. 7, after 5 minutes of application, SNP-STBs were found to still occlude the blood vessel. In particular, STB fills blood vessels more stably using blood as circulation media than using PBS. Pressure monitoring results showed that both the laponite-based STB and the SNP-based STB required more than 80 mmHg to move the STB. In both 10 nm SNP-STB and 30 nm SNP-STB, the pressure required to displace the STB increased as the proportion of SNP increased. In addition, the pressure required to displace the STB in the blood was higher than PBS, and this trend was more pronounced in the small 10 nm SNP-STB. In conclusion, we implemented an in vitro system to compare and analyze the occluding properties of STB. Through this system, we analyzed the difference in the force required by the change of SNP content in STBs.

Conclusion: One step further from the laponite-based STB, we have developed a novel STB using silica nanoparticles. The spherical 10 nm and 30 nm SNPs were found to have 1) shear thinning properties, 2) cytocompatibility, and 3) hemostatic properties, similar to our previously reported laponite. In addition, SNPs were found to exhibit relatively low negative charge and less injection force than laponite-based STBs. Based on these results, we expect to be able to use endovascular embolizing agents by selecting a tunable STB from different characteristics for the specific clinical situation. Further, we used a stereolithography 3D printing system that prints models that 1) can be expanded like a real blood vessel, 2) can be complex or various shapes, and 3) are directly printed without using a sacrificial mold. We were able to fabricate more than three different sizes and shapes of blood vessel models and connected them with pulsatile flow pumps, pressure sensors, catheters, and STB-filled syringes to complete the in vitro STB testing platform. Finally, we confirmed that both laponite-based STB and SNP-based STBs are stably located in the blood vessel in pulsatile flow using human blood. Through this system, we analyzed the difference in the force required by the change of SNP content in STBs.

Results and Discussion

Figure 2A:
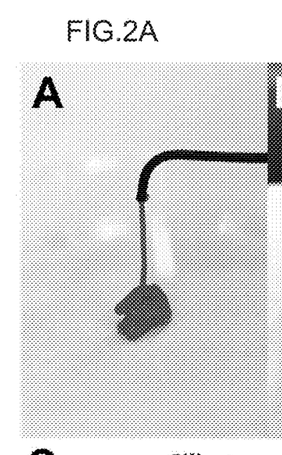
Figure 2B:
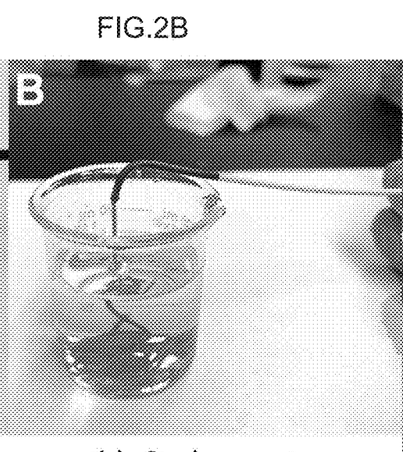
Figure 2C:
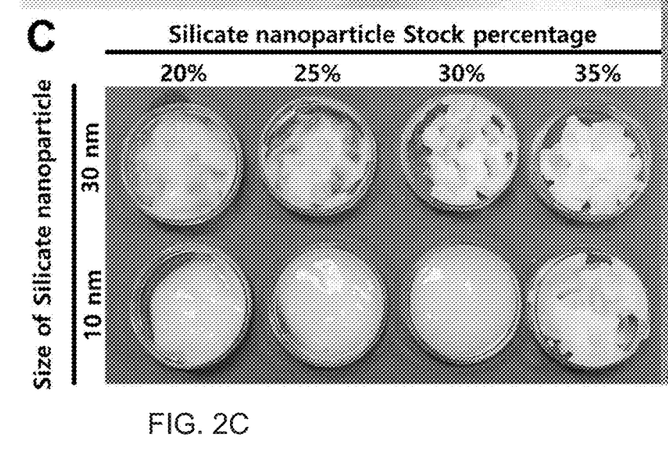
FIG. 2C shows the gross view of the silica nanoparticle-based STB with different silica nanoparticles sizes and concentrations from (20 to 35%).
Figure 2D:
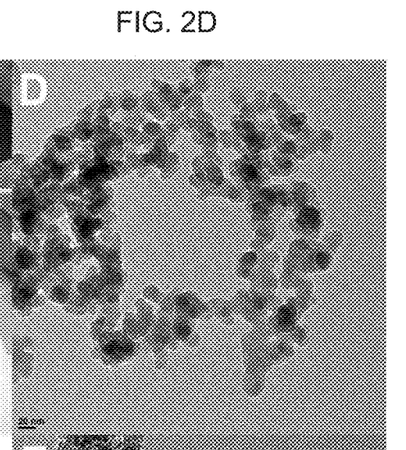
FIGS. 2D-2E show TEM images of silica nanoparticles with different size (S3, 30 nm, in FIG. 2D; S5, 10 nm, in FIG. 2E).
Figure 2E:
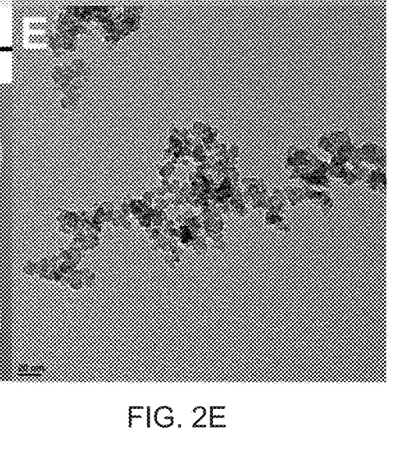
Figure 3A:
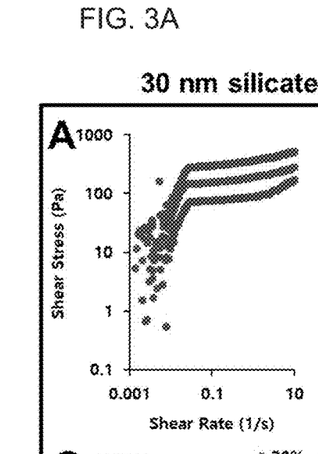
FIGS. 3A-3F provide data from the theological evaluation of silica nanoparticle-based STBs. Shear stress (FIG. 3A, and FIG. 3D), viscosity (FIG. 3B, and FIG. 3E), and storage moduli (FIG. 3C, and FIG. 3F) from silica nanoparticles-based STB with S3 (FIG. 3A, FIG. 3B, and FIG. 3C) and S5 (FIG. 3D, FIG. 3E, and FIG. 3F) after repeated application of high strain (100% oscillatory strain) over time.
Figure 3B:
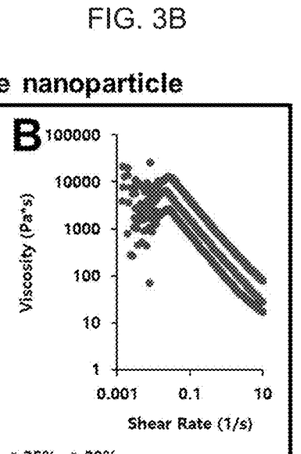
Figure 3C:
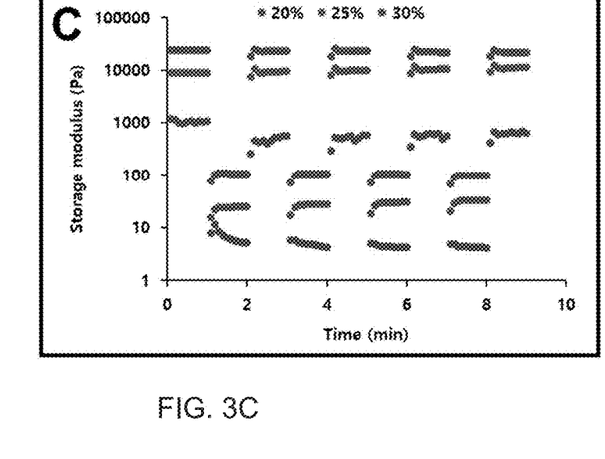
Figure 3D:
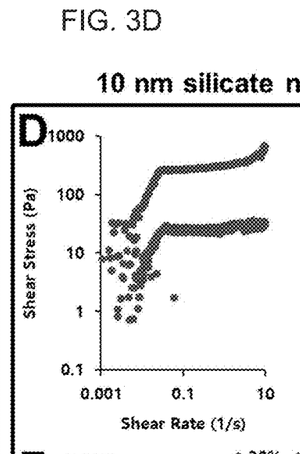
Figure 3E:
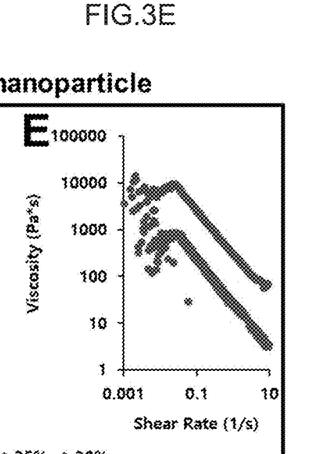
Figure 3F:
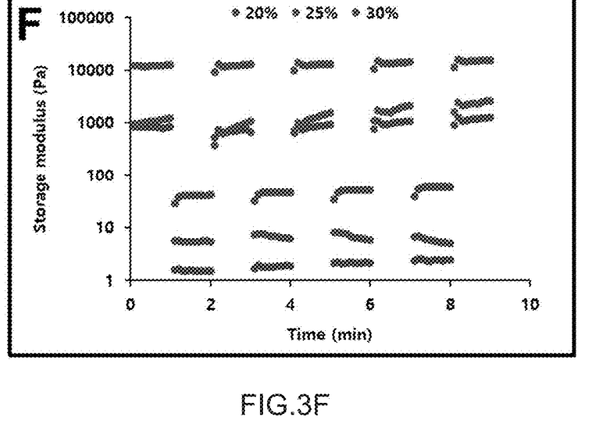

Injectable Gelatin/Silica Nanoparticles Hydrogel Compositions and Characterization Physical mixtures of gelatin and silica nanoparticles were used to formulate the STB in this study. As shown in the FIGS. 2A and B, the obtained STB showed good injectability and shear-thinning property both in air and water. The physical characteristics of prepared silica nanoparticles-based STB were varied with concentrations of gelatin and Silica nanoparticles. We observed gross morphology of the gels immediately after the final mixing stage and found trends across composition gradients (FIG. 2C). Silica nanoparticles-based STB with increasing the percentage of gelatin appeared more of a solid at room temperature. High gelatin content with low silica nanoparticles content resulted in a heterogeneous, rough appearance across the surface of the gel. Low concentration of both Silica nanoparticles and gelatin resulted in a hydrogel that flowed easily and acted as a homogeneous solution, and those with a higher percentage of Silica nanoparticles tended to have a more stable structure with the homogeneous surface. The latter traits were observed when either gelatin or silica nanoparticles content reached 30%. All 6 compositions gave way under some applied stress, and the nature of the hydrogels' shape recovery after elimination of stress was clarified with rheology experiments. With these observations, we confirmed that the hydrogels' physical characteristics could be altered by changing the composition. In this study we used two types of silica nanoparticles (S3 and S5) and as shown in the transmission electron microscopy (FIGS. 2D and E), both S3 and S5 were spherical nanoparticles with certain degree of aggregation. S3 had an average particle size of 30 nm while S5 had a size of 10 nm. Zeta potential measurement showed that both S3 and S5 were negative charges (−13 and −15 mV, respectively).

As an initial reflection of the host response, it is crucial to clarify the swelling capacity and degradation of injectable hydrogels in hemostatic and embolizing agent development (34, 35). Effective swelling capacity in STBs could lead to rapid hemostasis with the effect of blood aggregation. In addition, the release of drugs or solvents from the polymeric mixture is mainly controlled by hydrogel swelling degree and rate (36). To test the degradability of silica nanoparticles-based STB in vitro, different compositions (total 200 mg) were incubated with human plasma at 37° C. for 48 h. All silica nanoparticles-based STB with different compositions showed various degrees of swelling in the plasma ranging from 2% to 20% within 1 h. Interestingly, silica nanoparticles-based STB were degraded mainly depended on the amount of Silica nanoparticles in the hydrogels. Lowest silica nanoparticles groups (gelatin 1.5%/Silica nanoparticles 1.5% and gelatin 3.0%/Silica nanoparticles 1.5%) exhibited the fastest degradation among all groups, while more than 3% of Silica nanoparticles showed a degradation ratio less than 20% even after 48 hours. To further evaluate the effect of each component on the swellability, the weight of PBS-immersed swollen silica nanoparticles-based STB were compared to the freeze-dried hydrogels. Most of the different silica nanoparticles-based STB showed various degrees of swelling in PBS ranging from 500% to 1000% within 1 h. Our data indicated that swellability of silica nanoparticles-based STB were mostly dependent on the amount of gelatin. With the increase of gelatin percentage, swellability of silica nanoparticles-based STB decreases. Previously, STB was shown to have increased stability in a physiological environment mediated by robust interactions between ions within the STB (37) and the ability of Silica nanoparticles to physically strengthen a hydrogel nanostructure (14, 38). Moreover, increased physical interactions among nanostructure of gelatin with specifically charged surfaces of Silica nanoparticles may contribute to the formation of reversible nanostructure (39, 40).

All the above results indicate that the variations of gross morphology, degradability, and swellability among different compositions of silica nanoparticles-based STB can be modulated by relative amounts of gelatin and Silica nanoparticles.

Injectability and Rheological Characteristics of Silica Nanoparticles-Based STB

To answer the question of whether our silica nanoparticles-based STB shared the characteristics of injectable embolic biomaterials, we assessed injectability and shear-thinning characteristics of various compositions of silica nanoparticles-based STB. We observed that all compositions could be delivered via 5-Fr general catheter/3 cc syringe and 2.4-Fr microcatheter/1 cc syringe combinations. Relatively stable increasing-plateaued curves without clumping or irregular injection force fluctuations were observed regardless of the physical appearance of the silica nanoparticles-based STB (FIG. 3). The injection force measurement showed higher levels of injection force obtained by 5-French Beacon general catheter/3 cc syringe combination than that obtained by 2.4-French Beacon microcatheter/1 cc syringe combination. The results from using both catheters showed a similar increasing pattern among various compositions of gelatin and Silica nanoparticles. The plateau injection force of all compositions of silica nanoparticles-based STB demonstrated their injectability through both catheters for biological and medical applications such as hemostasis and endovascular embolization (FIG. 3). Although clinically relevant main input is generally known to be lower than 20N, the actual injectability depends not only on the force exerted on the syringe, but also on the ergonomic design of the syringe and catheter, which may affect the force applied in general (41, 42). To establish a threshold of applicable injection force, we compare to downward push finger strength gathered from a study of 150 subjects (43). Here, they found a (mean±s.d.) strength for downward thumb pushing of (184.1±52.2) N for males and (135.2±30.4) N for females ages 21-30. Though much higher than the force needed to deliver common medical solutions as contrast agent and saline solution by catheters (injection force: 1N) (22), the force required to inject silica nanoparticles based STB (injection force: 20~30N) is below 2 standard deviations of the mean of pushing strength for both males and females ages 21-30. Therefore, the silica nanoparticles-based STB can be easily applied by hand when the total concentration is less than 9.0% (2.4-Fr microcatheter) and 7.5% (w/v) (5-Fr general catheter), respectively. Our results show that all compounds can be injected in various size catheter/syringe combinations, but more than a certain percentage of the total composition (7.5%) may require a higher than normal injection force for clinical applications.

For determining whether the hydrogel materials are suitable for injection, rheological evaluation is an effective way of characterizing their viscoelasticity (44). The shear-thinning characteristics of silica nanoparticles-based STB were analyzed by recording viscosity across a range of shear rates (0.001-10 s$^{-1}$), and the sweep of shear rates was performed for measuring shear stress and viscosity (FIG. 3). All compositions exhibited steadily declining viscosity and concave-up stress-strain curves on logarithmic scales, indicating shear-thinning behavior. Across all samples, initial shear stress and viscosity increased with increasing concentrations of gelatin and Silica nanoparticles (FIG. 3).

Figure 4A:
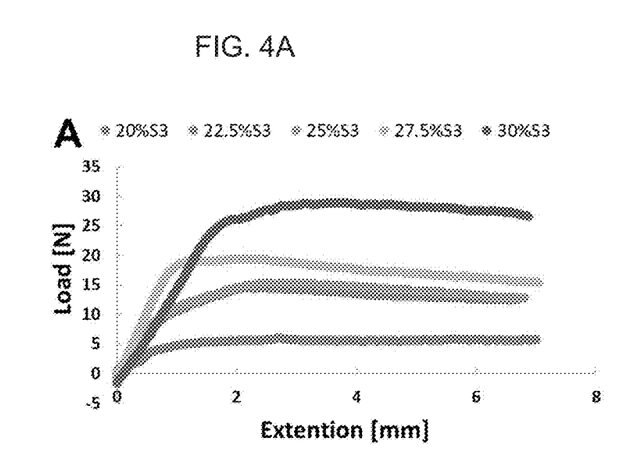
FIG. 4A and FIG. 4C show the curves of injection force from fresh prepared different compositions of silica nanoparticles-based STB using microcatheter catheter.
Figure 4B:
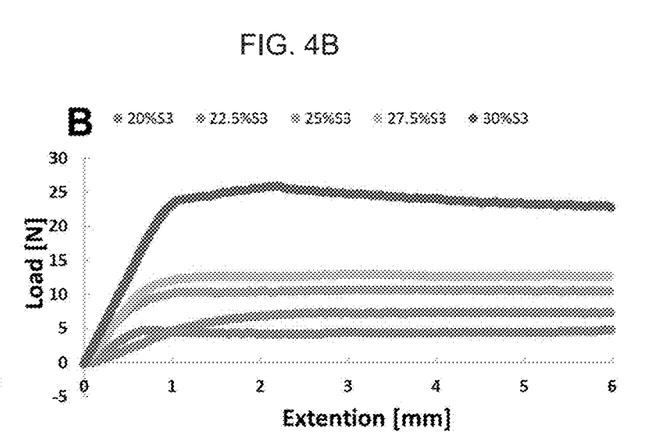
FIG. 4B and FIG. 4D showed the curves of the injection force after 3 weeks' storage and the injectability is maintained.
Figure 4C:
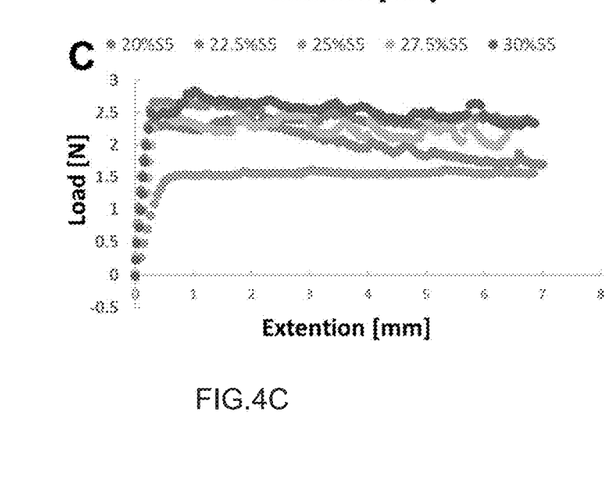
Figure 4D:
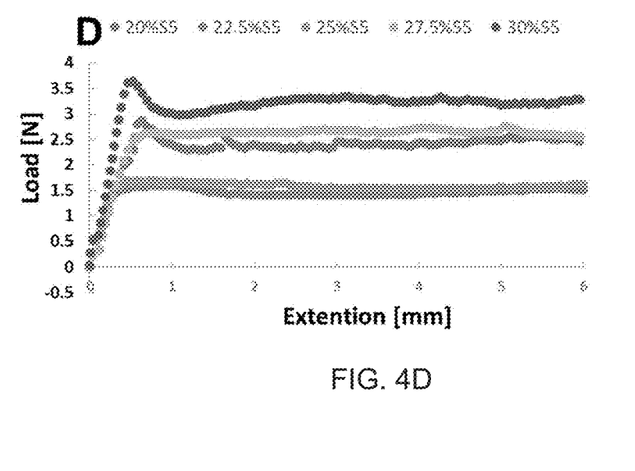

Mechanical restorability of STBs would determine the feasibility of their injection during endovascular application (45). To evaluate the mechanical stability of silica nanoparticles-based STB after injection, the recovery of modulus after application of high strain (100% oscillatory strain) was tested (FIG. 4). It is known that self-recovery characteristic (solidification of STBs after injection) is critical to remain localized (46). We showed that the silica nanoparticles-based STB could be recovered to their original modulus over several cycles, demonstrating these hydrogels possess the common characteristics of STBs. Previously we showed that 6% or 9% (w/v) nanosilica nanoparticles based STB have been proven to regain solid-like behavior rapidly following high strain (100% oscillatory strain) that led to liquid-like behavior in the nanosilica nanoparticles based STB (18). Here, all compositions showed rapid recovery and mechanical stability with shear-thinning characteristics, indicating the excellent STB recovery capability in response to varying shear strain. In the present work, storage modulus increased with a higher percentage of gelatin and Silica nanoparticles in composite hydrogel compositions, while the influence of Silica nanoparticles was much stronger than gelatin on shear-thinning characteristics (FIG. 4). In addition, we also tested the stability of the silica nanoparticles-based STB. As shown in FIG. 4B, after 3 weeks' storage, both S3 based STB and S5 based STB kept similar injection force curves compared to fresh one, indicating their good shelf-life. These properties, in the manufacture of STB, the shear-thinning properties are solely dependent on the silica nanoparticles and can be expected to have little or no effect on the composition ratio of gelatin. Therefore, it can be inferred that Silica nanoparticles will play a large role in the shear-thinning properties in various applications of STB, for example, the vascular penetration depth of various sizes and stability of 3D-bioprinted structures. Still, further evaluation of the potential effect on bioactivity as well as a biological disease model in vitro and in vivo will be required for future clinical translation.

CONCLUSION

We developed a novel shear-thinning biomaterial with the composite of gelatin and biocompatible silica nanoparticles with various properties. By tuning the properties of silica nanoparticles such as particles size and composition of gelation/silica nanoparticles, the mechanical and rheological properties can be carefully adjusted to meet different requirements. All the compositions used in these experiments are injectable through different sized catheters. The rheological tests showed rapid recovery and mechanical stability with shear-thinning characteristics which mainly depended on silica nanoparticles. Gelatin-Silica nanoparticles-based STBs display superior biological stability, body temperature extrudability, shear-thinning behavior, and rapid network recoverability. These attractive physicochemical properties are favorable for easy administration in vivo, and a gelatin-Silica nanoparticle-based STB may hold great potential in drug delivery, endovascular embolization, tissue regeneration, bioprinting and for other biomedical applications.

REFERENCES (1) Guvendiren, M., Lu, H. D., Burdick, J. A., Shear-thinning hydrogels for biomedical applications. *Soft Matter* 2012, 8, 260-272.
(2) Purcell, B. P., Lobb, D., Charati, M. B., Dorsey, S. M., et al., Injectable and bioresponsive hydrogels for on-demand matrix metalloproteinase inhibition. *Nat Mater* 2014, 13, 653-661.
(3) Jahan, K., Mekhail, M., Tabrizian, M., One-step fabrication of apatite-chitosan scaffold as a potential injectable construct for bone tissue engineering. *Carbohyd Polym* 2019, 203, 60-70.
(4) Yang, J. A., Yeom, J., Hwang, B. W., Hoffman, A. S., Hahn, S. K., In situ-forming injectable hydrogels for regenerative medicine. *Prog Polym Sci* 2014, 39, 1973-1986.
(5) Paul, A., Hasan, A., Kindi, H. A., Gaharwar, A. K., et al., Injectable graphene oxide/hydrogel-based angiogenic gene delivery system for vasculogenesis and cardiac repair. *ACS Nano* 2014, 8, 8050-8062.
(6) Su, D., Jiang, L., Chen, X., Dong, J., Shao, Z., Enhancing the Gelation and Bioactivity of Injectable Silk Fibroin Hydrogel with Laponite Nanoplatelets. *ACS Appl Mater Interfaces* 2016, 8, 9619-9628.
(7) Mulyasasmita, W., Cai, L., Hori, Y., Heilshorn, S. C., Avidity-controlled delivery of angiogenic peptides from injectable molecular-recognition hydrogels. *Tissue Eng Part A* 2014, 20, 2102-2114.
(8) Whitlow, J., Pacelli, S., Paul, A., Polymeric Nanohybrids as a New Class of Therapeutic Biotransporters. *Macromolecular Chemistry and Physics* 2016, 217, 1245-1259.
(9) Dawson, J. I., Oreffo, R. O. C., Clay: New Opportunities for Tissue Regeneration and Biomaterial Design. *Adv Mater* 2013, 25, 4069-4086.
(10) Gaharwar, A. K., Mihaila, S. M., Swami, A., Patel, A., et al., Bioactive Silicate Nanoplatelets for Osteogenic Differentiation of Human Mesenchymal Stem Cells. *Adv Mater* 2013, 25, 3329-3336.
(11) Tomas, H., Alves, C. S., Rodrigues, J., Laponite (R): A key nanoplatform for biomedical applications? *Nanomed-Nanotechnol* 2018, 14, 2407-2420.
(12) Dawson, J. I., Kanczler, J. M., Yang, X. B. B., Attard, G. S., Oreffo, R. O. C., Clay Gels For the Delivery of Regenerative Microenvironments. *Adv Mater* 2011, 23, 3304-+.
(13) Gaharwar, A. K., Cross, L. M., Peak, C. W., Gold, K., et al., 2D Nanoclay for Biomedical Applications: Regenerative Medicine, Therapeutic Delivery, and Additive Manufacturing. *Adv Mater* 2019, 31, e1900332.
(14) Xavier, J. R., Thakur, T., Desai, P., Jaiswal, M. K., et al., Bioactive nanoengineered hydrogels for bone tissue engineering: a growth-factor-free approach. *ACS Nano* 2015, 9, 3109-3118.
(15) Bhatnagar, D., Xu, D., Gersappe, D., Rafailovich, M. H., Hyaluronic Acid and Gelatin Clay Silica nanoparticles based STB: Substrates for Cell Adhesion and Controlled Drug Delivery. *Journal of Chemical and Biological Interfaces* 2014, 2, 34-44.
(16) Li, Y. L., Maciel, D., Tomas, H., Rodrigues, J., et al., pH sensitive Laponite/alginate hybrid hydrogels: swelling behaviour and release mechanism. *Soft Matter* 2011, 7, 6231-6238.
(17) Yang, H., Hua, S., Wang, W., Wang, A., Composite hydrogel beads based on chitosan and laponite: preparation, swelling, and drug release behaviour. 2011.
(18) Gaharwar, A. K., Avery, R. K., Assmann, A., Paul, A., et al., Shear-thinning nanosilica nanoparticles based STB for the treatment of hemorrhage. *ACS Nano* 2014, 8, 9833-9842.
(19) Higuchi, A., Suresh Kumar, S., Benelli, G., Ling, Q.-D., et al., Biomaterials used in stem cell therapy for spinal cord injury. *Progress in Materials Science* 2019, 103, 374-424.
(20) Hardy, J. G., Lee, J. Y., Schmidt, C. E., Biomimetic conducting polymer-based tissue scaffolds. *Curr Opin Biotechnol* 2013, 24, 847-854.
(21) Park, H., Temenoff, J. S., Tabata, Y., Caplan, A. I., Mikos, A. G., Injectable biodegradable hydrogel composites for rabbit marrow mesenchymal stem cell and growth factor delivery for cartilage tissue engineering. *Biomaterials* 2007, 28, 3217-3227.
(22) Avery, R. K., Albadawi, H., Akbari, M., Zhang, Y. S., et al., An injectable shear-thinning biomaterial for endovascular embolization. *Sci Transl Med* 2016, 8, 365ra156.
(23) Moore, M. J., Malaxos, L., Doyle, B. J., Development of a shear-thinning biomaterial as an endovascular embolic agent for the treatment of type B aortic dissection. *J Mech Behav Biomed Mater* 2019, 99, 66-77.
(24) Kerativitayanan, P., Tatullo, M., Khariton, M., Joshi, P., et al., Nanoengineered Osteoinductive and Elastomeric Scaffolds for Bone Tissue Engineering. *ACS Biomaterials Science & Engineering* 2017, 3, 590-600.
(25) Hasany, M., Thakur, A., Taebnia, N., Kadumudi, F. B., et al., Combinatorial Screening of Nanoclay-Reinforced Hydrogels: A Glimpse of the "Holy Grail" in Orthopedic Stem Cell Therapy? *ACS Applied Materials & Interfaces* 2018, 10, 34924-34941.
(26) Wilson, S. A., Cross, L. M., Peak, C. W., Gaharwar, A. K., Shear-Thinning and Thermo-Reversible Nanoengineered Inks for 3D Bioprinting. *ACS Appl Mater Interfaces* 2017, 9, 43449-43458.
(27) Samimi Gharaie, S., Dabiri, S. M. H., Akbari, M., Smart Shear-Thinning Hydrogels as Injectable Drug Delivery Systems. *Polymers (Basel)* 2018, 10.
(28) Sheikhi, A., Afewerki, S., Oklu, R., Gaharwar, A. K., Khademhosseini, A., Effect of ionic strength on shear-thinning nanoclay-polymer silica nanoparticles based STB. *Biomaterials Science* 2018, 6, 2073-2083.
(29) Ren, Y., Zhao, X., Liang, X., Ma, P. X., Guo, B., Injectable hydrogel based on quaternized chitosan, gelatin and dopamine as localized drug delivery system to treat Parkinson's disease. *International journal of biological macromolecules* 2017, 105, 1079-1087.
(30) Assmann, A., Vegh, A., Ghasemi-Rad, M., Bagherifard, S., et al., A highly adhesive and naturally derived sealant. *Biomaterials* 2017, 140, 115-127.
(31) Liu, X., Chen, W., Gustafson, C. T., Miller Ii, A. L., et al., Tunable tissue scaffolds fabricated by in situ crosslink in phase separation system. *RSC Advances* 2015, 5, 100824-100833.
(32) Akakuru, O., Isiuku, B., Chitosan Hydrogels and their Glutaraldehyde-CrosslinkedCounterparts as Potential Drug Release and Tissue Engineering Systems-Synthesis, Characterization, Swelling Kinetics and Mechanism. *J Phys Chem Biophys* 2017, 7, 2161-0398.1000256.

(33) Li, C., Mu, C., Lin, W., Ngai, T., Gelatin Effects on the Physicochemical and Hemocompatible Properties of Gelatin/PAAm/Laponite Nanosilica nanoparticles based STB. *ACS Appl Mater Interfaces* 2015, 7, 18732-18741.
(34) Mirzakhanian, Z., Faghihi, K., Barati, A., Momeni, H. R., Synthesis and characterization of fast-swelling porous superabsorbent hydrogel based on starch as a hemostatic agent. *J Biomater Sci Polym* Ed 2015, 26, 1439-1451.
(35) Behrens, A. M., Sikorski, M. J., Li, T., Wu, Z. J., et al., Blood-aggregating hydrogel particles for use as a hemostatic agent. *Acta Biomater* 2014, 10, 701-708.
(36) Ganji, F., Vasheghani Farahani, S., Vasheghani-Farahani, E., *Theoretical Description of Hydrogel Swelling: A Review*, 2010.
(37) Lokhande, G., Carrow, J. K., Thakur, T., Xavier, J. R., et al., Nanoengineered injectable hydrogels for wound healing application. *Acta Biomater* 2018, 70, 35-47.
(38) Gaharwar, A. K., Kishore, V., Rivera, C., Bullock, W., et al., Physically Crosslinked Nanocomposites from Silicate-Crosslinked PEO: Mechanical Properties and Osteogenic Differentiation of Human Mesenchymal Stem Cells. *Macromolecular Bioscience* 2012, 12, 779-793.
(39) Schexnailder, P., Schmidt, G., Nanocomposite polymer hydrogels. *Colloid and Polymer Science* 2009, 287, 1-11.
(40) Chimene, D., Alge, D. L., Gaharwar, A. K., Two-Dimensional Nanomaterials for Biomedical Applications: Emerging Trends and Future Prospects. *Adv Mater* 2015, 27, 7261-7284.
(41) Öhrlund, Å, Edsman, K., Sturesson, C., Nord, L., et al., *8th Anti-aging Medicine World Congress*, EuroMediCom Paris 2010, pp. 8-10.
(42) Vo, A., Doumit, M., Rockwell, G., The Biomechanics and Optimization of the Needle-Syringe System for Injecting Triamcinolone Acetonide into Keloids. *J Med Eng* 2016, 2016, 5162394.
(43) Peebles, L., Norris, B., Filling 'gaps' in strength data for design. *Applied ergonomics* 2003, 34, 73-88.
(44) Wang, H., Wu, Y., Cui, C., Yang, J., Liu, W., Antifouling Super Water Absorbent Supramolecular Polymer Hydrogel as an Artificial Vitreous Body. *Adv Sci (Weinh)* 2018, 5, 1800711.
(45) Samimi Gharaie, S., Dabiri, S. M. H., Akbari, M., Smart Shear-Thinning Hydrogels as Injectable Drug Delivery Systems. *Polymers* 2018, 10, 1317.
(46) Jalili, N. A., Jaiswal, M. K., Peak, C. W., Cross, L. M., Gaharwar, A. K., Injectable nanoengineered stimuli-responsive hydrogels for on-demand and localized therapeutic delivery. *Nanoscale* 2017, 9, 15379-15389.

All publications mentioned herein (e.g. the references numerically listed above, and U.S. Patent Publication 20180104059) are incorporated herein by reference to disclose and describe aspects, methods and/or materials in connection with the cited publications.

The invention claimed is:

1. A shear-thinning biocompatible composition of matter comprising:
    spherical silica nanoparticles, the spherical silica nanoparticles comprising from 15% to 45% (w/v) of the composition; and
    gelatin, the gelatin comprising from 1% to 30% (w/v) of the composition.
2. The composition of claim 1, wherein:
    the spherical silica nanoparticles have a median diameter of from 5 nm to 150 nm.
3. The composition of claim 2, wherein the composition:
    exhibits a shear stress of at least 50 Pa at a shear rate of 0.1 (l/s);
    exhibits a viscosity of at least 1,000 Pa*s at a shear rate of 0.1 (l/s); and/or
    exhibits a storage modulus of at least 1,000 Pa.
4. The composition of claim 1, further comprising a chemotherapeutic agent.
5. The composition of claim 1, wherein the spherical silica nanoparticles comprise a negative charge at physiological pH.
6. The composition of claim 5, wherein the spherical silica nanoparticles have a zeta potential of at least −10 mV at physiological pH.
7. The composition of claim 6, further comprising a pharmaceutical excipient selected from the group consisting of:
    a preservative, a tonicity adjusting agent, a detergent, a viscosity adjusting agent, a sugar and a pH adjusting agent.
8. The composition of claim 7, further comprising a therapeutic agent selected from an anti-inflammatory agent, a hemostatic agent, an embolic agent, or a chemotherapeutic agent.
9. The composition of claim 1, wherein the composition is disposed within a catheter.
10. A method of delivering a composition of claim 8 to a preselected site comprising:
    disposing the composition in a vessel having a first end comprising an opening and a second end;
    applying a force to the second end of the vessel, wherein the force is sufficient to liquify the composition; and
    delivering the composition out of the vessel through the opening and to the preselected site.
11. The method of claim 10, wherein the site is an in vivo site.
12. The method of claim 11, wherein the site is at an in vivo location where an individual has experienced trauma or injury.
13. The method of claim 10, wherein the vessel is a catheter.
14. A method of making a composition of claim 8 comprising combining together spherical silica nanoparticles and gelatin, a pharmaceutical excipient and a therapeutic agent so as to form a shear-thinning biocompatible composition.
15. The method of claim 14, wherein a surface property of the spherical silica nanoparticles, a median diameter of the spherical silica nanoparticles, a relative amount of spherical silica nanoparticles; and/or a relative amount of gelatin is selected to modulate one or more rheological properties of the composition such that the composition:
    exhibits a shear stress of at least 50 Pa at a shear rate of 0.1 (l/s);
    exhibits a viscosity of at least 1,000 Pa*s at a shear rate of 0.1 (l/s); and/or
    exhibits a storage modulus of at least 1,000 Pa.
16. A method of occluding a conduit, the method comprising:
    disposing the composition of claim 1 in a region of fluid flow within the conduit, wherein amounts of the composition are disposed in an area of fluid flow within the conduit that are sufficient to inhibit fluid flow through the conduit, thereby inhibiting fluid flow, so that the conduit is occluded.
17. The method of claim 16, wherein:
    the composition comprises spherical silica nanoparticles having a median diameter of from 5 nm to 150 nm and a zeta potential of at least −5 mV at physiological pH.

18. The method of claim 17, wherein the composition further includes a therapeutic agent selected from an anti-inflammatory agent, a hemostatic agent, an embolic agent, and a chemotherapeutic agent.

19. The method of claim 17, wherein the composition is disposed in the conduit using a 5-FR general catheter or a 2.4-Fr microcatheter.

20. The method of claim 17, wherein the conduit is a blood vessel.

* * * * *